US011492971B2

(12) United States Patent
Sodaro et al.

(10) Patent No.: US 11,492,971 B2
(45) Date of Patent: Nov. 8, 2022

(54) TURBINE ENGINE SYSTEM WITH HEAT EXCHANGER IN BYPASSABLE SECONDARY DUCT

(71) Applicant: United Technologies Corporation, Farmington, CT (US)

(72) Inventors: Joseph J. Sodaro, Manchester, CT (US); Thomas G. Phillips, Coventry, CT (US); Stephanie M. Polly, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 283 days.

(21) Appl. No.: 16/563,265

(22) Filed: Sep. 6, 2019

(65) Prior Publication Data
US 2021/0071581 A1   Mar. 11, 2021

(51) Int. Cl.
| F02C 7/18 | (2006.01) |
| F02C 9/18 | (2006.01) |
| F02K 3/06 | (2006.01) |
| F02K 3/08 | (2006.01) |
| F02K 3/105 | (2006.01) |

(52) U.S. Cl.
CPC ............... *F02C 7/18* (2013.01); *F02C 9/18* (2013.01); *F02K 3/06* (2013.01); *F02K 3/08* (2013.01); *F02K 3/105* (2013.01); *F05D 2260/213* (2013.01); *F05D 2260/606* (2013.01)

(58) Field of Classification Search
CPC . F02K 3/08; F02K 3/105; F02K 3/115; F02C 7/14; F02C 7/141; F02C 7/18; F05D 2260/213; B64D 13/08
See application file for complete search history.

(56) References Cited

U.S. PATENT DOCUMENTS

| 4,254,618 | A | * | 3/1981 | Elovic | F28D 21/0014 60/226.1 |
| 5,269,135 | A | * | 12/1993 | Vermejan | F02C 7/18 60/226.1 |
| 5,483,807 | A | * | 1/1996 | Abersfelder | B60H 1/00492 62/243 |
| 7,658,060 | B2 | | 2/2010 | Zysman | |

(Continued)

FOREIGN PATENT DOCUMENTS

EP    2085600 B1    6/2012

OTHER PUBLICATIONS

EP search report for EP20192964.3 dated Jun. 9, 2021.

*Primary Examiner* — Ehud Gartenberg
*Assistant Examiner* — Henry Ng
(74) *Attorney, Agent, or Firm* — Getz Balich LLC

(57) ABSTRACT

An assembly is provided for a turbine engine. This assembly includes a primary duct, a bleed duct, a plurality of secondary ducts, a heat exchanger and a flow regulator. The bleed duct extends from a bleed duct inlet to a bleed duct outlet. The bleed duct inlet is fluidly coupled with the primary duct. The secondary ducts are arranged in parallel between the bleed duct outlet and the primary duct. The secondary ducts include a first duct and a second duct. The heat exchanger is configured with the second duct. The flow regulator is configured to direct at least a majority of fluid flowing through the bleed duct outlet to: (A) the first duct during a first mode of operation; and (B) the second duct during a second mode of operation.

20 Claims, 8 Drawing Sheets

(56) References Cited

U.S. PATENT DOCUMENTS

| | | |
|---|---|---|
| 8,161,726 B2 | 4/2012 | Schwarz |
| 8,961,114 B2 | 2/2015 | Ruthemeyer |
| 9,234,707 B2 | 1/2016 | Mackin |
| 9,624,832 B2 | 4/2017 | Fletcher |
| 9,982,630 B2 | 5/2018 | Marini |
| 10,677,166 B2 * | 6/2020 | Pesyna .................... F02K 3/115 |
| 2009/0188232 A1 | 7/2009 | Suciu |
| 2009/0188234 A1 | 7/2009 | Suciu |
| 2013/0098046 A1 * | 4/2013 | Suciu ........................ F02C 7/08 |
| | | 60/39.23 |
| 2013/0186102 A1 * | 7/2013 | Lo ........................... F02K 3/075 |
| | | 60/785 |
| 2015/0047315 A1 * | 2/2015 | Snyder ..................... F02C 7/18 |
| | | 60/785 |
| 2016/0326903 A1 * | 11/2016 | Xu ........................... F02C 9/18 |
| 2017/0044984 A1 * | 2/2017 | Pesyna ................. B64D 33/10 |
| 2017/0159490 A1 * | 6/2017 | Sennoun ................. F02C 7/06 |
| 2019/0145317 A1 | 5/2019 | Holt |

* cited by examiner

TURBINE ENGINE SYSTEM WITH HEAT EXCHANGER IN BYPASSABLE SECONDARY DUCT

BACKGROUND OF THE DISCLOSURE

1. Technical Field

This disclosure relates generally to a turbine engine and, more particularly, to a heat exchange system for the turbine engine.

2. Background Information

A turbine engine may include a heat exchange system for cooling a fluid such as lubricant. The heat exchange system typically includes a heat exchanger. This heat exchanger may facilitate transfer of heat energy between the lubricant and another fluid such as air. The heat exchanger may be placed within a bypass duct of the turbine engine, or within a bleed duct that bleeds air from the bypass duct. While the known heat exchange systems have various advantages, there is still room in the art for improvement. There is a need in the art therefore for an improved heat exchange system for a turbine engine.

SUMMARY OF THE DISCLOSURE

According to an aspect of the present disclosure, an assembly is provided for a turbine engine. This assembly includes a primary duct, a bleed duct, a plurality of secondary ducts, a heat exchanger and a flow regulator. The bleed duct extends from a bleed duct inlet to a bleed duct outlet. The bleed duct inlet is fluidly coupled with the primary duct. The secondary ducts are arranged in parallel between the bleed duct outlet and the primary duct. The secondary ducts include a first duct and a second duct. The heat exchanger is configured with the second duct. The flow regulator is configured to direct at least a majority of fluid flowing through the bleed duct outlet to: (A) the first duct during a first mode of operation; and (B) the second duct during a second mode of operation.

According to another aspect of the present disclosure, another assembly is provided for a turbine engine. This assembly includes a primary duct, a bleed duct, a bypass secondary duct, a heat exchange secondary duct, a heat exchanger and a flow regulator. The bleed duct extends from a bleed duct inlet to a bleed duct outlet. The bleed duct inlet is fluidly coupled with the primary duct. The bypass secondary duct and the heat exchange secondary duct are arranged in parallel with the bypass secondary duct between the bleed duct outlet and the primary duct. The heat exchanger is within the heat exchange secondary duct. The assembly is configured such that at least a majority of fluid flowing through the bleed duct outlet flows into: (A) the bypass secondary duct when the flow regulator operates in a first mode; and (B) the heat exchange secondary duct when the flow regulator operates in a second mode.

According to still another aspect of the present disclosure, another assembly is provided for a turbine engine. This assembly includes a primary duct, a bleed duct, a first secondary duct, a second secondary duct, a flow impediment and a valve. The bleed duct is fluidly coupled with the primary duct. The first secondary duct is configured as an open duct. The second secondary duct is arranged in parallel with the first secondary duct between the bleed duct and the primary duct. The flow impediment is within the second secondary duct. The valve is arranged at an intersection between the bleed duct, the first secondary duct and the second secondary duct. The valve is configured to substantially close an inlet to the second secondary duct during a first mode. The valve is further configured to substantially close an inlet to the first secondary duct during a second mode.

The flow regulator may be configured to direct at least substantially all of the fluid flowing through the bleed duct outlet to: (A) the first duct during the first mode of operation; and (B) the second duct during the second mode of operation.

The flow regulator may be configured as or otherwise include a two way valve.

The flow regulator may be located between the bleed duct and the first duct.

The flow regulator may be located between the bleed duct and the second duct.

The flow regulator may include a door configured to move between a first position and a second position. The door may be configured to block flow from the bleed duct outlet to the second duct when the door is in the first position. The door may be configured to block flow from the bleed duct outlet to the first duct when the door is in the second position.

The heat exchanger may be configured as a gas-to-liquid heat exchanger.

The heat exchanger may be configured as a gas-to-gas heat exchanger.

The heat exchanger may extend radially across the second duct.

The primary duct may be a bypass duct of the turbine engine.

The assembly may also include an engine core and a core nacelle housing at least a portion of the engine core. The bleed duct and the plurality of secondary ducts may be located between the core nacelle and a case of the engine core.

The primary duct may extend from a primary duct inlet to a primary duct outlet. The bleed duct inlet may be downstream of the primary duct inlet. The secondary ducts may be fluidly coupled with the primary duct upstream of the primary duct outlet.

The first duct may be radially between the primary duct and the second duct relative to a centerline of the turbine engine.

The first duct may be configured as or otherwise include an open duct.

The assembly may be configured such that at least substantially all of the fluid flowing through the bleed duct outlet flows into: (A) the bypass secondary duct during the first mode; and (B) the heat exchange secondary duct during the second mode.

The flow regulator may be configured as or otherwise include a two way valve arranged between (A) the bleed duct outlet and (B) the bypass and the heat exchange secondary ducts.

A first flow path from the primary duct, through the bleed duct and the bypass secondary duct, back to the primary duct may have a first pressure drop. A second flow path from the primary duct, through the bleed duct and the heat exchange secondary duct, back to the primary duct may have a second pressure drop that is greater than the first pressure drop.

The valve may include a door configured to move between a first position and a second position. The door may be configured to close a passage from the bleed duct to the second secondary duct when the door is in the first position.

The door may be configured to close a passage from the bleed duct to the first secondary duct when the door is in the second position.

The foregoing features and the operation of the invention will become more apparent in light of the following description and the accompanying drawings.

DETAILED DESCRIPTION

Figure 1:
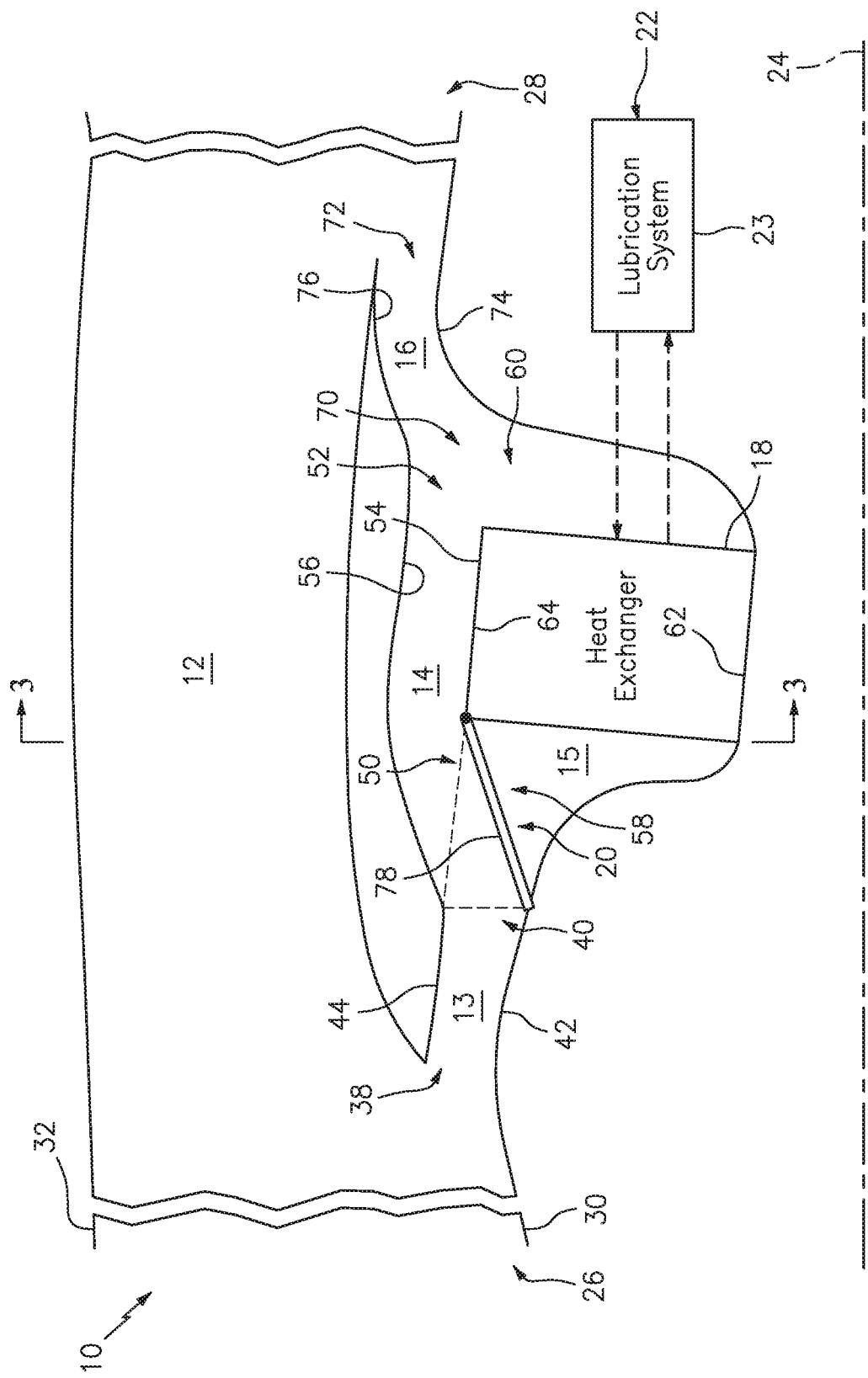
FIG. 1 is a schematic side sectional illustration of a turbine engine assembly during a first mode of operation.
Figure 2:
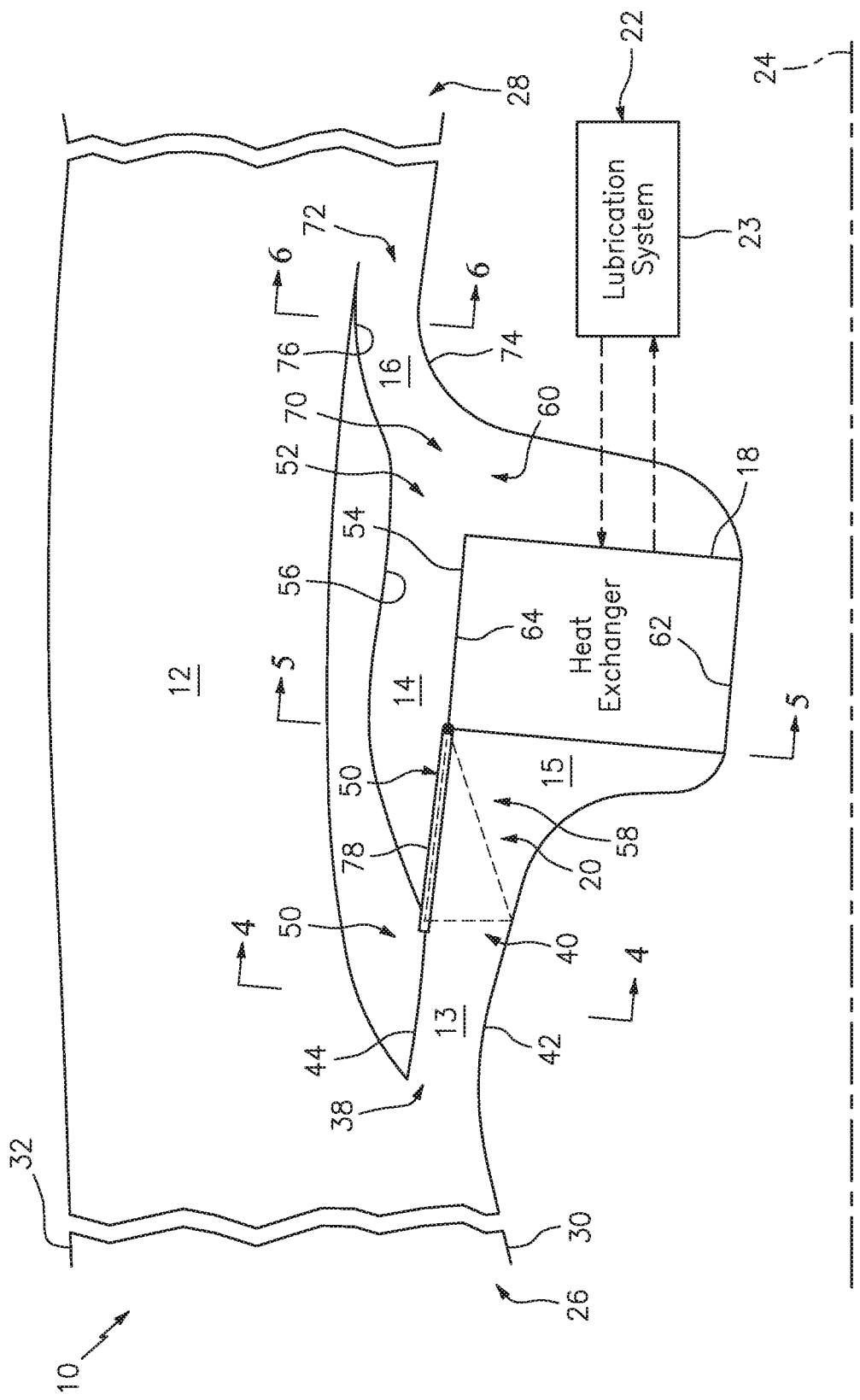
FIG. 2 is a schematic side sectional illustration of the turbine engine assembly during a second mode of operation.

FIG. 1 is a schematic side sectional illustration of an assembly 10 for a turbine engine during a first mode of operation. FIG. 2 is a schematic side sectional illustration of the turbine engine assembly 10 during a second mode of operation. The turbine engine assembly 10 of FIGS. 1 and 2 includes a primary duct 12, a bleed duct 13, a plurality of secondary ducts 14 and 15 and an outlet duct 16. The turbine engine assembly 10 also includes a heat exchange system. This heat exchange system includes a heat exchanger 18, a flow regulator 20 and a fluid system 22. Examples of the fluid system 22 include, but are not limited to, a lubrication system, a fuel system, a bleed air system and a cabin air system. However, for ease of description, the fluid system 22 is referred to below as a lubrication system 23.

The primary duct 12 may be configured as an annular duct; e.g., a bypass duct. The primary duct 12 of FIG. 3, for example, extends circumferentially around an axial centerline 24 of the turbine engine. Referring again to FIGS. 1 and 2, the primary duct 12 extends longitudinally (e.g., axially along the axial centerline 24) from a (e.g., axially forward) primary duct inlet 26 to a (e.g., axially aft) primary duct outlet 28; e.g. a bypass duct nozzle. The primary duct 12 extends vertically (e.g., radially relative to the axial centerline 24) between a vertical first (e.g., radial inner) primary duct sidewall 30 and a vertical second (e.g., radial outer) primary duct sidewall 32.

Figure 4:
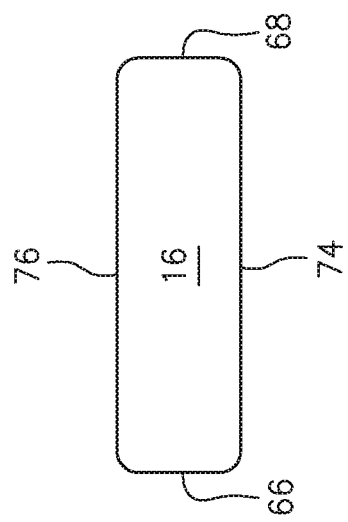
FIG. 4 is a cross-sectional illustration of a bleed duct taken along line 4-4 in FIG. 2.

The bleed duct 13 may be configured as a tubular (e.g., non-annular) duct. The bleed duct 13 of FIG. 4, for example, extends laterally (e.g., circumferentially or tangentially) between a lateral first bleed duct sidewall 34 and a lateral second bleed duct sidewall 36. Referring again to FIGS. 1 and 2, the bleed duct 13 extends longitudinally (e.g., approximately axially along the axial centerline 24) from a (e.g., axially forward) bleed duct inlet 38 to a (e.g., axially aft) bleed duct outlet 40. The bleed duct inlet 38 may be defined by an aperture in the vertical first primary duct sidewall 30 such that the bleed duct inlet 38 is fluidly coupled with the primary duct 12 longitudinally between the primary duct inlet 26 and the primary duct outlet 28. The bleed duct 13 extends vertically (e.g., approximately radially relative to the axial centerline 24) between a vertical first (e.g., radial inner) bleed duct sidewall 42 and a vertical second (e.g., radial outer) bleed duct sidewall 44.

The bleed duct 13 may have a (e.g., average or maximum) cross-sectional area that is significantly less than a (e.g., average or maximum) cross-sectional area of the primary duct 12. For example, the primary duct cross-sectional area may be at least twenty times (e.g., $20x$) greater than the bleed duct cross-sectional area. The present disclosure, of course, is not limited to such an exemplary ratio of cross-sectional areas. The cross-sectional area of the bleed duct 13 may be measured as an area of the bleed duct 13 taken in a plane perpendicular to a longitudinal centerline of the bleed duct 13; e.g., plane of FIG. 4. Similarly, the cross-sectional area of the primary duct 12 may be measured as an area of the primary duct 12 taken in a plane perpendicular to a longitudinal centerline (e.g., the axial centerline 24) of the primary duct 12; e.g., plane of FIG. 3.

The bypass secondary duct 14 (e.g., a first of the secondary ducts) may be configured as a tubular (e.g., non-annular) duct. The bypass secondary duct 14 of FIG. 5, for example, extends laterally (e.g., circumferentially or tangentially) between a lateral first bypass secondary duct sidewall 46 and a lateral second bypass secondary duct sidewall 48. Referring again to FIGS. 1 and 2, the bypass secondary duct 14 extends longitudinally (e.g., approximately axially along the axial centerline 24) from a (e.g., axially forward) bypass secondary duct inlet 50 to a (e.g., axially aft) bypass secondary duct outlet 52. The bypass secondary duct 14 extends vertically (e.g., approximately radially relative to the axial centerline 24) between a vertical first (e.g., radial inner) bypass secondary duct sidewall 54 and a vertical second (e.g., radial outer) bypass secondary duct sidewall 56.

The bypass secondary duct 14 may have a (e.g., average or maximum) cross-sectional area that is exactly or approximately (e.g., +/−5%) equal to the cross-sectional area of the bleed duct 13. The present disclosure, of course, is not limited to such an exemplary ratio of cross-sectional areas. For example, in other embodiments, the bypass secondary duct cross-sectional area may be more than five percent greater than or less than the bleed duct cross-sectional area. The cross-sectional area of the bypass secondary duct 14 may be measured as an area of the bypass secondary duct 14 taken in a plane perpendicular to a longitudinal centerline of the bypass secondary duct 14; e.g., see plane FIG. 5.

The heat exchanger (HX) secondary duct 15 (e.g., a second of the secondary ducts) may be configured as a tubular (e.g., non-annular) duct. The HX secondary duct 15 of FIG. 5, for example, extends laterally (e.g., circumferentially or tangentially) between a lateral first HX secondary duct sidewall 54 and a lateral second HX secondary duct sidewall 56. Referring again to FIGS. 1 and 2, the HX secondary duct 15 extends longitudinally (e.g., approximately axially along the axial centerline 24) from a (e.g., axially forward) HX secondary duct inlet 58 to a (e.g., axially aft) HX secondary duct outlet 60. The HX secondary duct 15 extends vertically (e.g., approximately radially relative to the axial centerline 24) between a vertical first (e.g., radial inner) HX secondary duct sidewall 62 and a vertical second (e.g., radial outer) HX secondary duct sidewall 64.

The HX secondary duct 15 may have a (e.g., average or maximum) cross-sectional area that is greater (e.g., 1.5× to 10×, or more) than the cross-sectional areas of the bleed duct 13 and/or the bypass secondary duct 14. The present disclosure, of course, is not limited to such an exemplary ratio of cross-sectional areas. The cross-sectional area of the HX secondary duct 15 may be measured as an area of the HX secondary duct 15 taken in a plane perpendicular to a longitudinal centerline of the HX secondary duct 15; e.g., see plane of FIG. 5.

Figure 6:
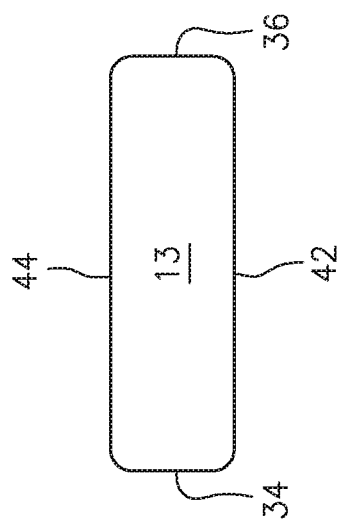
FIG. 6 is a cross-sectional illustration of an outlet duct taken along line 6-6 in FIG. 2.

The outlet duct 16 may be configured as a tubular (e.g., non-annular) duct. The outlet duct 16 of FIG. 6, for example, extends laterally (e.g., circumferentially or tangentially) between a lateral first outlet duct sidewall 66 and a lateral second outlet duct sidewall 68. Referring again to FIGS. 1 and 2, the outlet duct 16 extends longitudinally (e.g., approximately axially along the axial centerline 24) from a (e.g., axially forward) outlet duct inlet 70 to a (e.g., axially aft) outlet duct outlet 72. The outlet duct outlet 72 may be defined by an aperture in the vertical first primary duct sidewall 30 such that the outlet duct outlet 72 is fluidly coupled with the primary duct 12 longitudinally between the primary duct inlet 26 and the primary duct outlet 28, and downstream of the bleed duct inlet 38. The outlet duct 16 extends vertically (e.g., approximately radially relative to the axial centerline 24) between a vertical first (e.g., radial inner) outlet duct sidewall 74 and a vertical second (e.g., radial outer) outlet duct sidewall 76.

The bypass secondary duct 14 and the HX secondary duct 15 are arranged and connected in parallel between the bleed duct outlet 40 and the outlet duct inlet 70. The outlet duct 16 fluidly couples the secondary ducts 14 and 15 back to the primary duct 12. The secondary ducts 14 and 15 are thereby arranged and connected in parallel between the bleed duct 13 and the primary duct 12 such that the secondary duct outlets 52 and 60 are fluidly coupled with the primary duct 12 longitudinally between the primary duct inlet 26 and the primary duct outlet 28, and downstream of the bleed duct inlet 38. Of course, in other embodiments, the outlet duct 16 may be omitted where, for example the secondary duct outlets 52 and 60 are configured as a common outlet defined by a single aperture in the vertical first primary duct sidewall 30.

The heat exchanger 18 may be configured as a gas-to-gas heat exchanger or a gas-to-liquid heat exchanger. The heat exchanger 18 of FIGS. 1 and 2, for example, may be configured as an air-to-lubricant (e.g., an air-to-oil (AOC)) heat exchanger. This heat exchanger 18 is configured as part of the fluid system 22 as described above. For example, the heat exchanger 18 may be fluidly coupled inline with the lubrication system 23.

Figure 5:
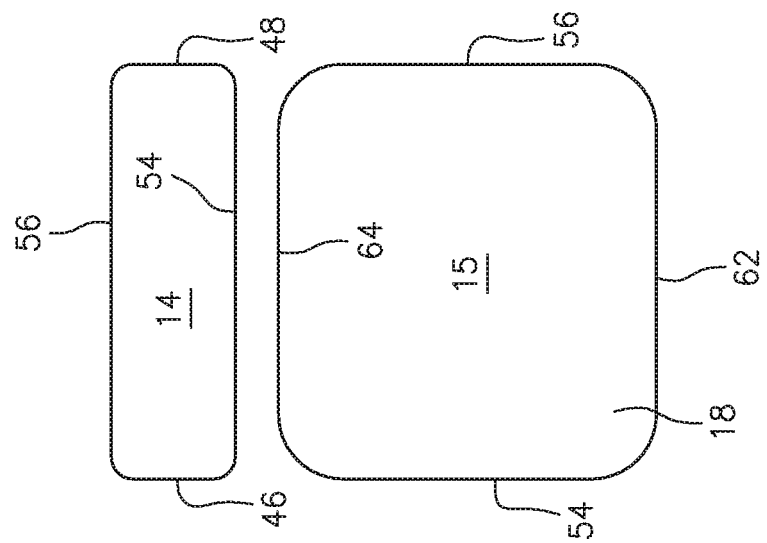
FIG. 5 is a cross-sectional illustration of a secondary ducts taken along line 5-5 in FIG. 2.

The heat exchanger 18 is arranged with the HX secondary duct 15. The heat exchanger 18 of FIGS. 1 and 2, for example, is located within the HX secondary duct 15. Referring to FIG. 5, the heat exchanger 18 may extend laterally across the HX secondary duct 15 between the sides 54 and 56. The heat exchanger 18 may also or alternatively extend vertically across the HX secondary duct 15 between the sides 62 and 64.

Figure 7:
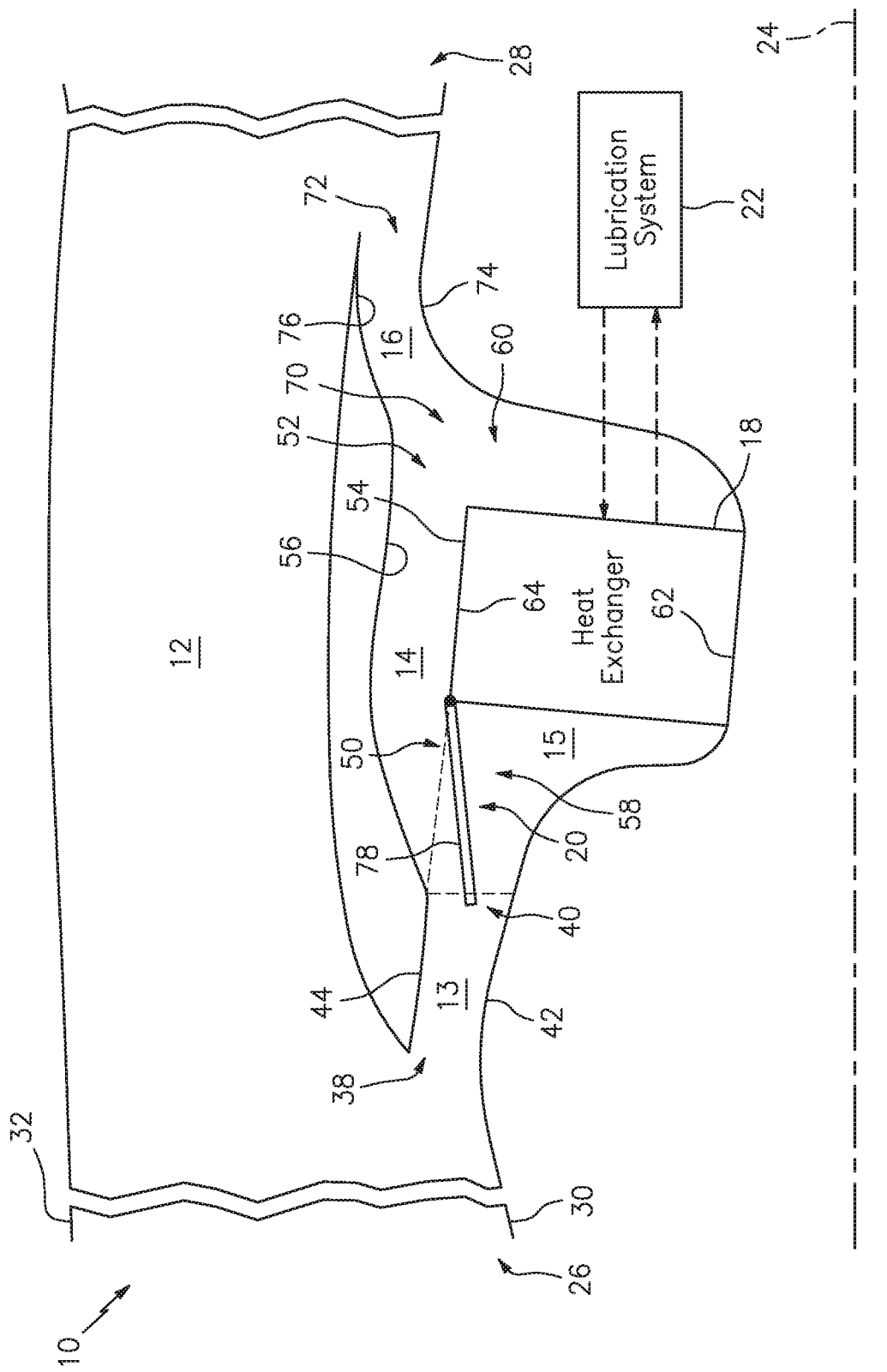
FIG. 7 is a schematic side sectional illustration of the turbine engine assembly during a third mode of operation.

The flow regulator 20 of FIGS. 1 and 2 is configured with the turbine engine assembly 10 such that at least a majority (e.g., more than at least 75%), or exactly or substantially all (e.g., more than at least 95%) of fluid (e.g., gas/air) flowing through the bleed duct outlet 40 flows: (A) into the bypass secondary duct 14 when the flow regulator 20 operates in the first mode (e.g., see FIG. 1); and (B) into the HX secondary duct 15 and, thus, through and/or about the heat exchanger 18 when the flow regulator 20 operates in the second mode (e.g., see FIG. 2). For example, the flow regulator 20 may be configured as a valve arranged at an intersection between the bleed duct outlet 40 and the secondary duct inlets 50 and 58. With such a configuration, the flow regulator 20 is configured to direct at least the majority or all of the fluid flowing through the bleed duct outlet 40: (A) into the bypass secondary duct 14 when the flow regulator 20 operates in the first mode (e.g., see FIG. 1); and (B) into the HX secondary duct 15 and, thus, through and/or about the heat exchanger 18 when the flow regulator 20 operates in the second mode (e.g., see FIG. 2). Of course, in some embodiments such as that shown in FIG. 7, the flow regulator 20 may also be configured to operate in a third mode where the regulator 20 directs a first portion (e.g., between 30% and 70%, for example ~50%) of the fluid into the bypass secondary duct 14 and a second portion (e.g., between 30% and 70%, for example ~50%) of the fluid into the HX secondary duct 15. The value of the first and the second portions may, of course, vary depending upon mode of operation and/or operating conditions.

The flow regulator 20 of FIGS. 1 and 2 is configured as a two way valve. The flow regulator 20 of FIGS. 1 and 2, for example, includes a door 78 (e.g., a flap or gate) configured to move (e.g., pivot) between a first position (see FIG. 1) and a second position (see FIG. 2); of course, in some embodiments, the door 78 may also move (e.g., pivot) to one or more intermediate positions (e.g., see intermediate position of FIG. 7). When the door 78 is in the first position of FIG. 1, the door 78 is adapted to substantially close (e.g., block) the HX secondary duct inlet 58 such that: (A) the HX secondary duct 15 is fluidly decoupled from the bleed duct 13; and/or (B) the bypass secondary duct 14 is fluidly coupled with the bleed duct 13. Thus, during the first mode, fluid (e.g., air) flow bled off from the primary duct 12 into the bleed duct 13 is routed through the bypass secondary duct 14 and the outlet duct 16 and back into the primary duct 12; see also FIG. 8A. By contrast, when the door 78 is in the second position of FIG. 2, the door 78 is adapted to substantially close (e.g., block) the bypass secondary duct inlet 50 such that: (A) the bypass secondary duct 14 is fluidly decoupled from the bleed duct 13; and/or (B) the HX secondary duct 15 is fluidly coupled with the bleed duct 13. Thus, during the second mode, the fluid flow bled off from the primary duct 12 into the bleed duct 13 is routed through the HX secondary duct 15 and the outlet duct 16 and back into the primary duct 12; see also FIG. 8B. The bled fluid may thereby flow through and/or about the heat exchanger 18 in order to, for example, cool another fluid (e.g., the lubricant from the system 23) flowing through the heat exchanger 18.

During turbine engine operation, fluid (e.g., gas/air) flows longitudinally through the primary duct 12 from the primary duct inlet 26 to the primary duct outlet 28. A portion (e.g., less than about 10-20%) of the fluid is bled off from the primary duct 12 and flows into the bleed duct 13. This bled fluid then flows through the bypass secondary duct 14 and back to the primary duct 12 during the first mode; see FIG. 8A. During this mode, the heat exchanger 18 may be term "non-operational" as the bleed fluid does not flow therethrough for heat exchange with the other fluid; e.g., lubricant of the lubrication system 23. When the other fluid requires cooling, however, the flow regulator 20 may move its door 78 from the first position (see FIG. 1) to the second position (see FIG. 2) such that the bled fluid now flows through the HX secondary duct 15 and the heat exchanger 18 before flowing back to the primary duct 12; see FIG. 8B. When the other fluid no longer requires cooling, the flow regulator 20 may move its door 78 back from the second position (see FIG. 2) to the first position (see FIG. 1).

Figure 8A:
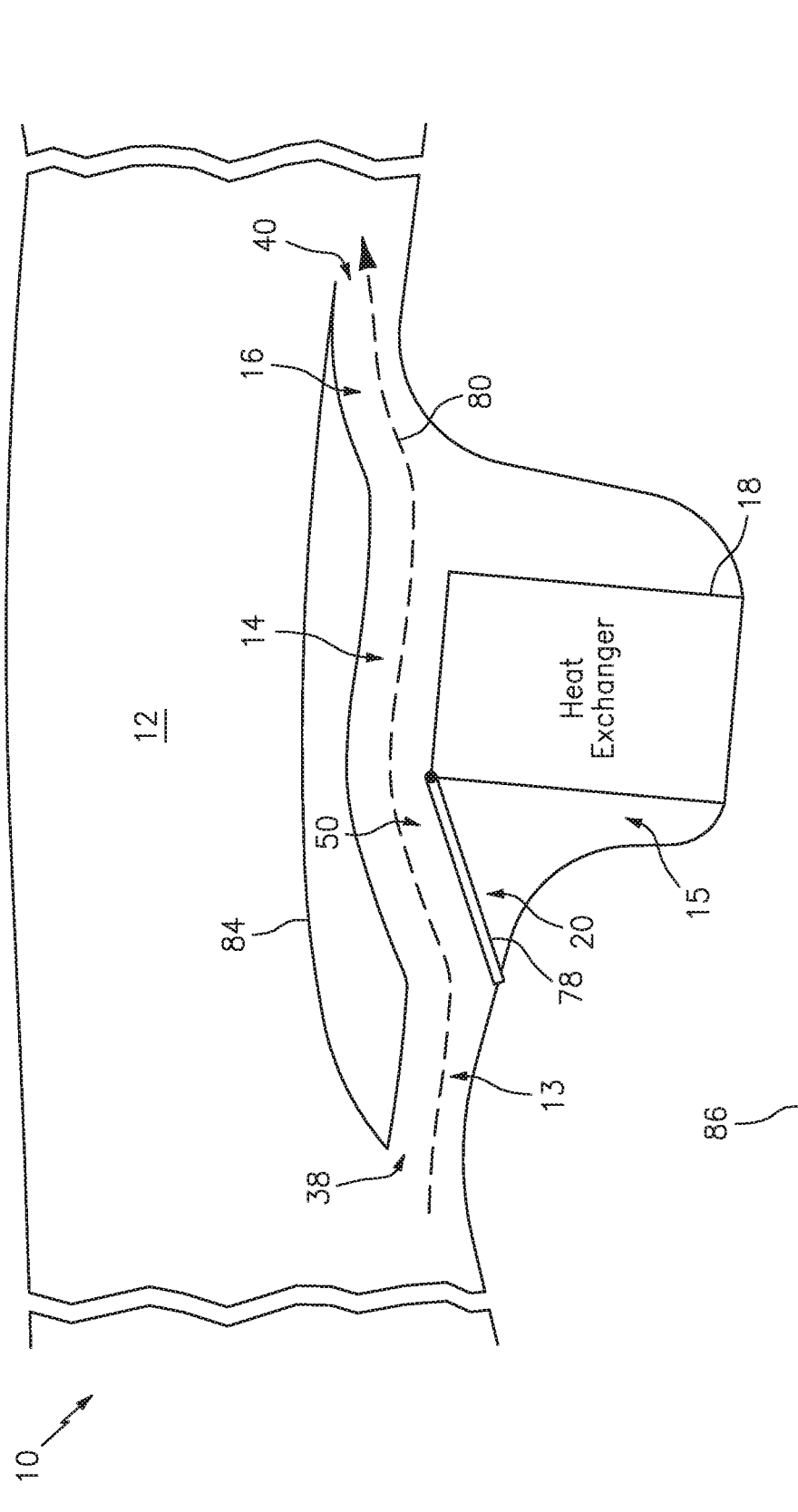
FIG. 8A is a schematic side sectional illustration depicting a flowpath through the turbine engine assembly during the first mode of operation.
Figure 8B:
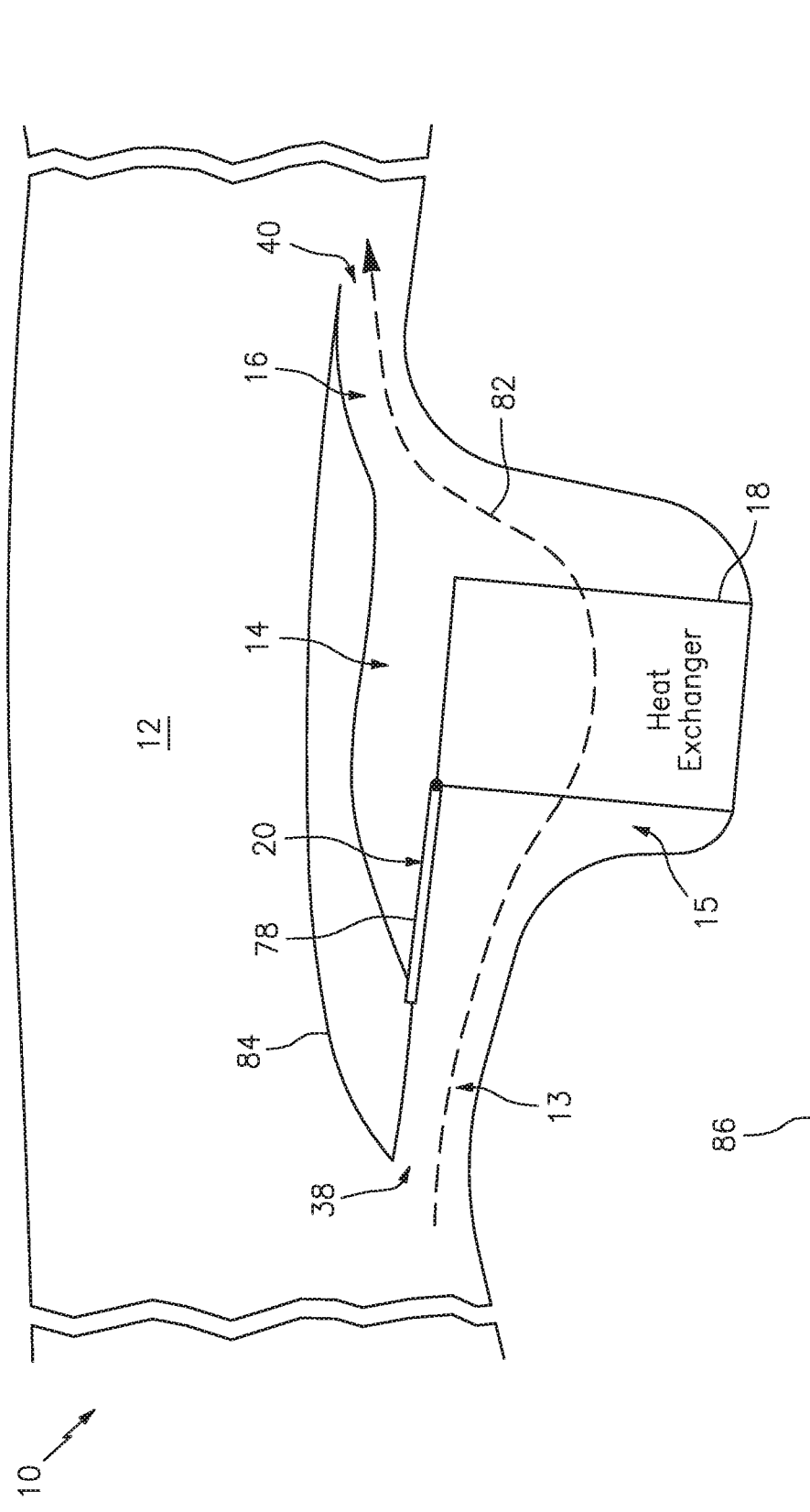
FIG. 8B is a schematic side sectional illustration depicting another flowpath through the turbine engine assembly during the second mode of operation.

Referring to FIG. 8A, a bypass flow path 80 from the primary duct 12, through the bleed duct 13, the bypass secondary duct 14 and the outlet duct 16, back to the primary duct 12 has a first pressure drop. Referring now to FIG. 8B, a heat exchange (HX) flow path 82 from the primary duct 12, through the bleed duct 13, the HX secondary duct 15 and the outlet duct 16, back to the primary duct 12 has a second pressure drop. This second pressure drop is greater than the first pressure drop (e.g., when comparing similar turbine engine operating conditions) because the bypass secondary duct 14 is an open duct, whereas the HX secondary duct 15 includes at least one impediment to flow ("flow impediment"); e.g., the heat exchanger 18. The turbine engine assembly 10 may thereby have a greater efficiency when operating in the first mode (see FIGS. 1 and 8A) as compared to when operating in the second mode (see FIGS. 2 and 8B). Therefore, the flow regulator 20 may operate in the second mode (e.g., only) when the other fluid requires cooling.

Figure 3:
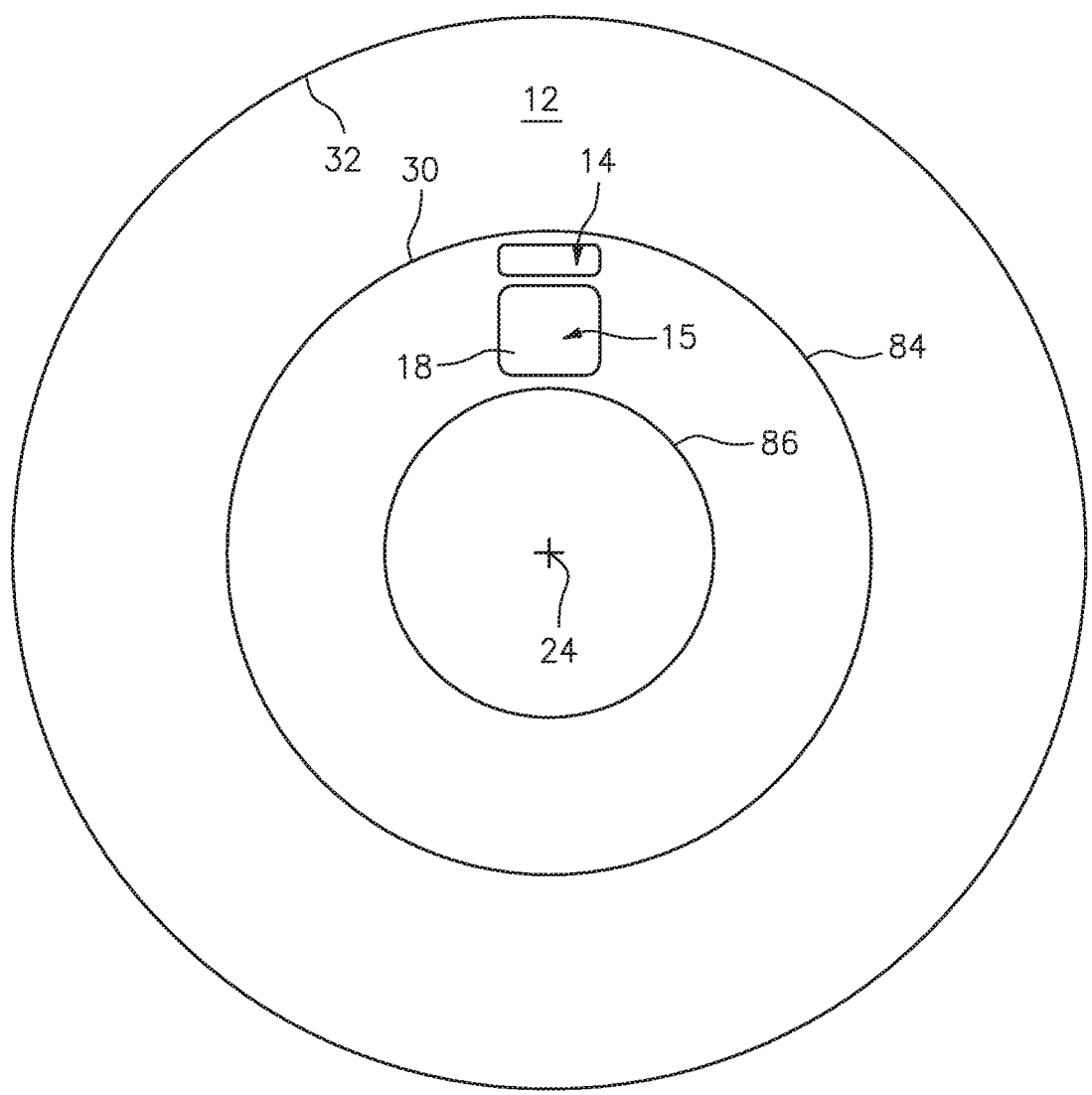
FIG. 3 is a cross-sectional illustration of a portion of the turbine engine assembly taken along line 3-3 in FIG. 1.

Referring to FIGS. 3, 8A and 8B, in some embodiments, one or more or each of the ducts 13-16 may be arranged in a cavity between a core nacelle 84 (e.g., inner barrel of an inner fixed structure (IFS)) and a case 86 of an engine core. Briefly, the core nacelle 84 is a skin that provides an aerodynamic covering for and houses at least a portion of the engine core. The case 86 is a structure that houses and contains components (e.g., rotors, a combustor, etc.) of the engine core.

In some embodiments, the primary duct 12 may circumscribe the ducts 13-16. The bypass secondary duct 14 may be positioned radially between the primary duct 12 and the HX secondary duct 15.

Figure 9:
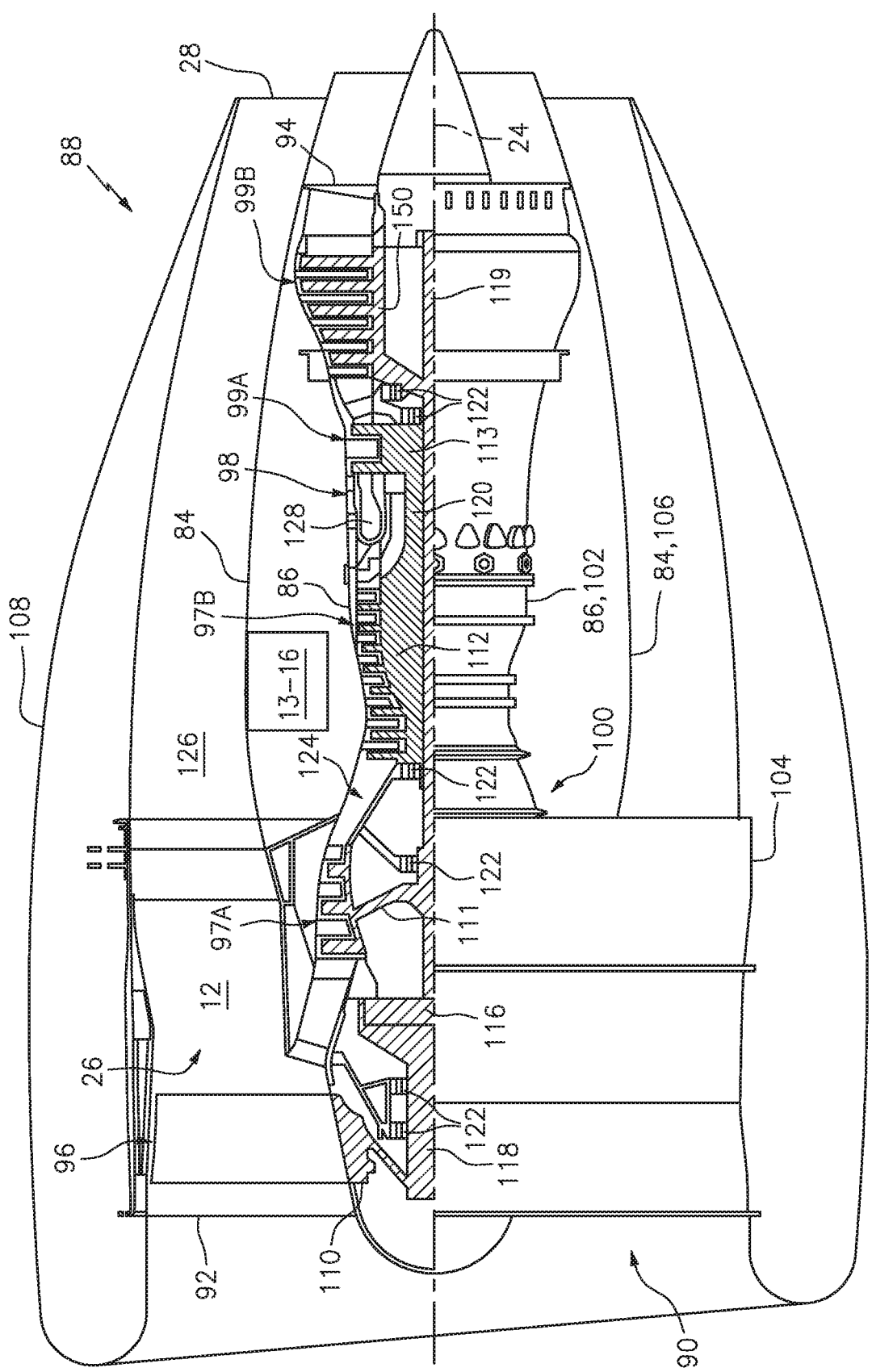
FIG. 9 is a side cutaway illustration of a system which includes the turbine engine system and a geared turbine engine.

FIG. 9 is a side cutaway illustration of a turbine engine system 88. This turbine engine system 88 includes a geared turbine engine 90 and a nacelle structure. The turbine engine 90 extends along the axial centerline 24 between an upstream airflow inlet 92 and a downstream airflow exhaust 94. The turbine engine 90 includes a fan section 96, a compressor section, a combustor section 98 and a turbine section. The compressor section includes a low pressure compressor (LPC) section 97A and a high pressure compressor (HPC) section 97B. The turbine section includes a high pressure turbine (HPT) section 99A and a low pressure turbine (LPT) section 99B.

The engine sections 96-99B are arranged sequentially along the centerline 24 within an engine housing 100. This housing 100 includes an inner case 102 (e.g., the core case 86 of FIGS. 1 and 2) and an outer case 104 (e.g., a fan case). The inner case 102 may house one or more of the engine sections 97A-99B; e.g., the engine core. The outer case 104 may house at least the fan section 96.

The nacelle structure includes an inner nacelle 106 (e.g., the core nacelle 84 of FIGS. 1 and 2) and an outer nacelle 108. The inner nacelle 106 houses and provides an aerodynamic cover for the inner case 102. The outer nacelle 108 houses and provides an aerodynamic cover the outer case 104. The outer nacelle 108 also overlaps a portion of the inner nacelle 106 thereby defining a bypass duct (e.g., the primary duct 12 of FIGS. 1 and 2).

Each of the engine sections 96, 97A, 97B, 99A and 99B includes a respective rotor 110-114. Each of these rotors 110-114 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 110 is connected to a gear train 116, for example, through a fan shaft 118. The gear train 116 and the LPC rotor 111 are connected to and driven by the LPT rotor 114 through a low speed shaft 119. The HPC rotor 112 is connected to and driven by the HPT rotor 113 through a high speed shaft 120. The shafts 118-120 are rotatably supported by a plurality of bearings 122; e.g., rolling element and/or thrust bearings. Each of these bearings 122 is connected to the engine housing 100 by at least one stationary structure such as, for example, an annular support strut.

During operation, air enters the turbine engine 90 through the airflow inlet 92. This air is directed through the fan section 96 and into a core gas path 124 and a bypass gas path 126. The core gas path 124 extends sequentially through the engine sections 97A-99B; e.g., the engine core. The air within the core gas path 124 may be referred to as "core air". The bypass gas path 126 extends through the bypass duct (e.g., the primary duct 12 of FIGS. 1 and 2), which bypasses the engine core. The air within the bypass gas path 126 may be referred to as "bypass air".

The core air is compressed by the compressor rotors 111 and 112 and directed into a combustion chamber 128 of a combustor in the combustor section 98. Fuel is injected into the combustion chamber 128 and mixed with the compressed core air to provide a fuel-air mixture. This fuel air mixture is ignited and combustion products thereof flow through and sequentially cause the turbine rotors 113 and 114 to rotate. The rotation of the turbine rotors 113 and 114 respectively drive rotation of the compressor rotors 112 and 111 and, thus, compression of the air received from a core airflow inlet. The rotation of the turbine rotor 114 also drives rotation of the fan rotor 110, which propels bypass air through and out of the bypass gas path 126. The propulsion of the bypass air may account for a majority of thrust generated by the turbine engine, e.g., more than seventy-five percent (75%) of engine thrust. The turbine engine of the present disclosure, however, is not limited to the foregoing exemplary thrust ratio.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a turbine engine configured without a gear train. The turbine engine assembly 10 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
    a primary duct;
    a bleed duct extending from a bleed duct inlet to a bleed duct outlet, the bleed duct inlet fluidly coupled with the primary duct;
    a plurality of secondary ducts arranged in parallel between the bleed duct outlet and the primary duct, the plurality of secondary ducts including a first duct and a second duct;
    a heat exchanger configured with the second duct; and
    a flow regulator configured to direct at least a majority of fluid flowing through the bleed duct outlet to
        the first duct during a first mode of operation; and
        the second duct during a second mode of operation;
    wherein a sidewall is located between the first duct and the second duct, and the sidewall extends axially along the heat exchanger.

2. The assembly of claim 1, wherein the flow regulator is configured to direct at least substantially all of the fluid flowing through the bleed duct outlet to
    the first duct during the first mode of operation; and
    the second duct during the second mode of operation.

3. The assembly of claim 1, wherein the flow regulator comprises a two way valve.

4. The assembly of claim 1, wherein the flow regulator is located between the bleed duct and the first duct.

5. The assembly of claim 1, wherein the flow regulator is located between the bleed duct and the second duct.

6. The assembly of claim 1, wherein
    the flow regulator includes a door configured to move between a first position and a second position;
    the door is configured to block flow from the bleed duct outlet to the second duct when the door is in the first position; and
    the door is configured to block flow from the bleed duct outlet to the first duct when the door is in the second position.

7. The assembly of claim 1, wherein the heat exchanger is configured as a gas-to-liquid heat exchanger.

8. The assembly of claim 1, wherein the heat exchanger is configured as a gas-to-gas heat exchanger.

9. The assembly of claim 1, wherein the heat exchanger extends radially across the second duct to the sidewall.

10. The assembly of claim 1, wherein the primary duct is a bypass duct of the turbine engine.

11. The assembly of claim 1, further comprising:
    an engine core; and
    a core nacelle housing at least a portion of the engine core;
    wherein the bleed duct and the plurality of secondary ducts are located between the core nacelle and a case of the engine core.

12. The assembly of claim 1, wherein
    the primary duct extends from a primary duct inlet to a primary duct outlet;
    the bleed duct inlet is downstream of the primary duct inlet; and
    the plurality of secondary ducts are fluidly coupled with the primary duct upstream of the primary duct outlet.

13. The assembly of claim 1, wherein
    the first duct is radially between the primary duct and the second duct relative to a centerline of the turbine engine; and
    the sidewall is radially between the heat exchanger and the first duct.

14. The assembly of claim 1, wherein the first duct is an open duct.

15. An assembly for a turbine engine, comprising:
    a primary duct;
    a bleed duct extending from a bleed duct inlet to a bleed duct outlet, the bleed duct inlet fluidly coupled with the primary duct;
    a bypass secondary duct and a heat exchange secondary duct arranged in parallel with the bypass secondary duct between the bleed duct outlet and the primary duct;
    a heat exchanger within the heat exchange secondary duct; and
    a flow regulator, the assembly configured such that at least a majority of fluid flowing through the bleed duct outlet flows into
        the bypass secondary duct when the flow regulator operates in a first mode; and
        the heat exchange secondary duct when the flow regulator operates in a second mode;
    wherein a radial height of the heat exchanger is larger than a radial height of a portion of the bypass secondary duct that axially overlaps the heat exchanger.

16. The assembly of claim 15, wherein the assembly is configured such that at least substantially all of the fluid flowing through the bleed duct outlet flows into
    the bypass secondary duct during the first mode; and
    the heat exchange secondary duct during the second mode.

17. The assembly of claim 15, wherein the flow regulator comprises a two way valve arranged between the bleed duct outlet and the bypass and the heat exchange secondary ducts.

18. The assembly of claim 15, wherein
    a first flow path from the primary duct, through the bleed duct and the bypass secondary duct, back to the primary duct has a first pressure drop; and
    a second flow path from the primary duct, through the bleed duct and the heat exchange secondary duct, back to the primary duct has a second pressure drop that is greater than the first pressure drop.

19. An assembly for a turbine engine, comprising:
    a primary duct;
    a bleed duct fluidly coupled with the primary duct;
    a first secondary duct configured as an open duct;
    a second secondary duct arranged in parallel with the first secondary duct between the bleed duct and the primary duct;
    a flow impediment within the second secondary duct; and
    a valve arranged at an intersection between the bleed duct, the first secondary duct and the second secondary duct, the valve configured to substantially close an inlet to the second secondary duct during a first mode, and the valve further configured to substantially close an inlet to the first secondary duct during a second mode;
    wherein a radial height of the flow impediment is larger than a radial height of a portion of the first secondary duct that axially overlaps the flow impediment.

20. The assembly of claim 19, wherein
    the valve includes a door configured to move between a first position and a second position;
    the door is configured to close a passage from the bleed duct to the second secondary duct when the door is in the first position; and the door is configured to close a passage from the bleed duct to the first secondary duct when the door is in the second position.

\* \* \* \* \*